(12) United States Patent
Raghukumar et al.

(10) Patent No.: US 11,156,734 B1
(45) Date of Patent: Oct. 26, 2021

(54) VECTOR SENSOR-BASED ACOUSTIC MONITORING SYSTEM

(71) Applicant: Integral Consulting Inc., Seattle, WA (US)

(72) Inventors: Kaustubha Raghukumar, Santa Cruz, CA (US); Grace Chang Spada, Santa Barbara, CA (US); Frank Spada, Santa Barbara, CA (US); Craig A. Jones, Santa Cruz, CA (US)

(73) Assignee: Integral Consulting Inc., Seattle, WA (US)

( * ) Notice: Subject to any disclaimer, the term of this patent is extended or adjusted under 35 U.S.C. 154(b) by 0 days.

(21) Appl. No.: 16/879,434

(22) Filed: May 20, 2020

Related U.S. Application Data (60) Provisional application No. 63/016,046, filed on Apr. 27, 2020.

(51) Int. Cl.
| | |
|---|---|
| *G01V 1/16* | (2006.01) |
| *B63B 17/00* | (2006.01) |
| *H04B 11/00* | (2006.01) |

(52) U.S. Cl.
CPC .............. *G01V 1/16* (2013.01); *B63B 17/00* (2013.01); *H04B 11/00* (2013.01)

(58) Field of Classification Search
CPC ............ G01V 1/16; H04B 11/00; B63B 17/00
See application file for complete search history.

(56) References Cited

U.S. PATENT DOCUMENTS

| 9,784,860 | B2 * | 10/2017 | Lambert | ................... G01V 1/36 |
| 2006/0044938 | A1 * | 3/2006 | Shipps | ..................... G01V 1/16 367/13 |
| 2010/0281979 | A1 * | 11/2010 | McConnell | ............ G01V 1/181 73/514.28 |
| 2011/0216626 | A1 * | 9/2011 | Stacey | ................... H04B 11/00 367/131 |

OTHER PUBLICATIONS

Copping A. et al., "Annex IV 2016 State of the Science Report: Environmental Effects of Marine Renewable Energy Development Around the World," Ocean Energy Systems, Apr. 25, 2016, 224 pp.
Roche, R.C. et al., "Research priorities for assessing potential impacts of emerging marine renewable energy technologies: Insights from developments in Wales (UK)," Renewable Energy, vol. 99, Dec. 2016, pp. 1327-1341.

(Continued)

*Primary Examiner* — Daniel Pihulic
(74) *Attorney, Agent, or Firm* — Soquel Group LLC (57) ABSTRACT

An acoustic monitoring system characterizes, classifies, and geo-locates anthropogenic and natural sounds in near real time. The system includes a compact array of three acoustic vector sensors, which measures acoustic pressure and the three-dimensional particle velocity vector associated with the propagation of an acoustic wave, thereby inherently providing bearing information to an underwater source of sound. Beamforming techniques provide sound source localization, allowing for characterization of the acoustic signature of specific underwater acoustic sources.

20 Claims, 10 Drawing Sheets

(56) References Cited

OTHER PUBLICATIONS

National Marine Fisheries Service, "2018 Revision to: Technical Guidance for Assessing the Effects of Anthropogenic Sound on Marine Mammal Hearing (Version 2.0): Underwater Thresholds for Onset of Permanent and Temporary Threshold Shifts," U.S. Deptartment of Commerce, NOAA Technical Memorandum NMFS-OPR-59, Apr. 2018, pp. 1-178.
Haxel J. et al., "A portable, real-time passive acoustic system and autonomous hydrophone array for noise monitoring of offshore wave energy projects," 4th Marine Energy Technology Symposium (METS), Washington, DC, USA, Apr. 26, 2016, 5 pp.
Greene C.R., Jr. et al., "Directional frequency and recording (DIFAR) sensors in seafloor recorders to locate calling bowhead whales during their fall migration," The Journal of Acoustical Society of America, vol. 116, Issue 2, Aug. 2, 2004, pp. 799-813.
Rush B. et al., "Development of an adaptable monitoring package for marine renewable energy projects Part 1: Conceptual design and operation," Proceedings of the 2nd Marine Energy Technology Symposium (METS), Global Marine Renewable Energy Conference, Seattle, WA, USA, Apr. 15-18, 2014, pp. 1-11.
Chandrayadula, T. K. et al., "Monterey Bay ambient noise profiles using underwater gliders," Proceedings of Meetings on Acoustics, vol. 19, Issue 1, May 14, 2013, 070031, pp. 1-9.
Polagye B. et al., "Diifling Acoustic Instrumentation for Marine Energy," Poster in International Conference on the Environmental Interactions of Marine Energy Technologies, Orkney, UK, 2018.
D'Spain, G. L. et al., "The simultaneous measurement of infrasonic acoustic particle velocity and acoustic pressure in the ocean by freely drifting Swallow floats," IEEE Journal of Oceanic Engineering, vol. 16, No. 2, Apr. 1991, pp. 195-207.
Thode, A. M. et al., "Matched-field processing, geoacoustic inversion, and source signature recovery of blue whale vocalizations," The Journal of Acoustical Society of America, vol. 107, Issue 3, Mar. 2000, pp. 1286-1300.
Tougaard, J. "Underwater noise from a wave energy converter is unlikely to affect marine mammals," PLoS ONE, Jul. 6, 2015, https://doi.org/10.1371/journal.pone.0132391, pp. 1-7.
Hawkins, A.D. et al., "Assessing the impact of underwater sound on fishes and other forms of marine life," Acoustic Today, vol. 10, Issue 2, Mar. 1, 2014, pp. 30-41.
NDT Resource Center, Available online: https://www.nde-ed.org/GeneralResources/MaterialProperties/UT/ut_matlprop_index.htm (accessed on Feb. 14, 2020).
Mellinger, D.K. et al., "An overview of fixed passive acoustic observation methods for cetaceans," Oceanography, vol. 20, No. 4, Dec. 2007, p. 36-45.
McKenna, M et al., "Underwater radiated noise from modern commercial ships," The Journal of the Acoustical Society of America, vol. 131, Issue 1, Jan. 13, 2012, pp. 92-103.
Bassett, C. et al., "Flow-noise and turbulence in two tidal channels," The Journal of the Acoustical Society of America, vol. 135, Issue 4, Apr. 2014, p. 1764-1774.
D'Spain, G.L., "Energetics of the Deep Ocean's Infrasonic Sound Field," The Journal of Acoustical Society of America, vol. 89, Issue 3, 1991, pp. 1134-1158.
Thode, A. et al., "Tracking sperm whales with a towed acoustic vector sensor," The Journal of the Acoustical Society of America, vol. 128, Issue 5, Nov. 2010, pp. 2681-2694.
Nehorai, A. et al., "Acoustic vector-sensor array processing," IEEE Transactions on Signal Processing, vol. 42, No. 9, Sep. 1994, pp. 2481-2491.
Santos, P. et al., "Source localization with vector sensor array during the Makai experiment," In Proceedings of the 2nd International Conference and Exhibition on "Underwater Acoustic Measurements: Technologies and Results," Heraklion, Greece, Jun. 25-29, 2007, 6 pp.
Merchant, N.D. et al., "Underwater noise levels in UK waters," Scientific Reports, vol. 6, Art. No. 36942, Nov. 6, 2016, 10 pp.
Hester, K.C. et al., "Unanticipated consequences of ocean acidification: A noisier ocean at lower pH," Geophysical Research Letters, vol. 35, Issue 19, L19601, Oct. 1, 2008, 5 pp.
National Research Council, "Ocean Noise and Marine Mammals," The National Academies Press: Washington, DC, USA, 2003, 221 pp.
"The Global Ocean Observing System," Available online: https://www.goosocean.org/index.php?option=com_content&view=article&id=14<emid=114 (accessed on Feb. 14, 2020).
"OSPAR Commission," Available online: https://www.ospar.org/ (accessed on Feb. 14, 2020).
"Joint Monitoring Program for Ambient Noise North Sea (JOMOPANS)", Available online: https://northsearegion.eu/iomopans/ (accessed on Feb. 14, 2020).
Nedelec, S.L. et al., "Particle motion: The missing link in underwater acoustic ecology," Methods in Ecology and Evolution, vol. 7, Issue 7, Jul. 2016, pp. 836-842.
Holler, R.A., "The Evolution of the Sonobuoy from World War II to the Cold War," U.S. Navy Journal of Underwater Acoustics, JUA-2014-025-N, Navmar Applied Sciences Corporation, Warminster, PA, USA, Jan. 2014, pp. 322-346.
McDonald, M.A., "Difar hydrophone usage in whale research," Canadian Acoustics, vol. 32, No. 2, Jun. 2004, pp. 155-160.
Kaplan, M. et al., "Coral reef soundscapes may not be detectable far from the reef.,". Scientific Reports, vol. 6, Art. No. 31862, Aug. 23, 2016, 10 pp.
Horodysky, A.Z. et al., "Acoustic pressure and particle motion thresholds in six sciaenid fishes," The Journal of Experimental Biology, vol. 211, Mar. 5, 2008, p. 1504-1511.
McConnell, J.A., "Analysis of a compliantly suspended acoustic velocity sensor," The Journal of Acoustical Society of America, vol. 113, No. 3, Apr. 2003, pp. 1395-1405.
Brienzo, R.K. et al., "Broadband matched-field processing," The Journal of Acoustical Society of America, vol. 94, Issue 5, 1993, pp. 2821-2831.
Raghukumar, K. et al., "A Vector Sensor-Based Acoustic Characterization System for Marine Renewable Energy," Journal of Marine Science and Engineering, vol. 8, Issue 3, Mar. 10, 2020, 15 pp.

* cited by examiner

VECTOR SENSOR-BASED ACOUSTIC MONITORING SYSTEM

CROSS-REFERENCE TO RELATED APPLICATIONS

This application claims the benefit of U.S. Provisional Application No. 63/016,046, filed Apr. 27, 2020.

GOVERNMENT LICENSE RIGHTS

This invention was made with government support under Award Number DE-EE0007822 by the US Department of Energy's Office of Energy Efficiency and Renewable Energy (EERE) under the Water Power Technologies Office. The government has certain rights in the invention.

BACKGROUND

Ocean ambient noise levels appear to be increasing worldwide, as a result of increasing anthropogenic activities (e.g., shipping, seismic surveys, and pile-driving), ocean acidification, and global economic growth, thereby further decreasing the ability of marine animals to communicate, find prey, and socialize. In recognition of its identified importance, underwater sound is now a key ocean variable, along with the more well-known quantities such as temperature, salinity, and density. Several large international efforts are now underway to identify and quantify long-term trends in underwater noise levels, such as the Oslo Paris (OSPAR) convention, Marine Strategy Framework Initiative, and the Joint Monitoring Program for Ambient Noise North Sea (JOMOPANS). In light of these efforts, acoustic monitoring technology helps to identify noise sources using localization capability, and it can pave the way for improved characterization of quantities of interest. For example, acoustic particle velocity is a quantity of interest for fish and marine invertebrates.

Prior art acoustic source localization systems typically employs large arrays consisting of multiple hydrophones. The large size and footprint of hydrophone arrays can, therefore, make it difficult to deploy using a small vessel in energetic environments, for example, near operational marine renewable energy (MRE) devices. An attractive alternative to the use of large hydrophone arrays is the use of compact arrays of acoustic vector sensors. A vector sensor measures three-dimensional (3D) acoustic particle velocity in addition to acoustic pressure on a single sensor, which inherently provides directional information (acoustic bearing) to a source of sound. A vector sensor array (VSA) can, therefore, triangulate individual measured bearings to provide sound source localization, thereby helping to characterize sounds specific to a source. MRE devices typically emit low-intensity operational sounds on the order of 110-130 decibels (dB) referenced to 1 microPascal (re 1 µPa) at 1 m. These levels are considerably lower than sounds from other anthropogenic activities such as shipping or pile-driving that are known to exceed 180 dB re 1 µPa. Therefore, to characterize ocean sounds from a variety of sources, it is important to be able to distinguish a sound from other sources of sound such as boats, marine mammals, and fish choruses. Furthermore, given the increasing interest on acoustic particle velocity effects on fishes and invertebrates, the particle motion measurements afforded by a VSA can play an important role in further understanding this aspect of acoustic propagation.

Acoustic vector sensors have been in use since the 1950s, primarily as the acoustic sensing unit on board US Navy directional sonobuoys for anti-submarine warfare. The utility of these sensors to localize acoustic sources such as baleen whales and ships has been explored in several studies. Also, the importance of particle motion in coral reef soundscapes and its significance to fish has been evaluated and these findings contributed to the increasing awareness of its biological significance. However, widespread commercial application of acoustic vector sensors has been hampered to date by the affordability of reasonably priced sensors, lack of documentation, and challenges in suppressing motion-induced noise (flow noise) and electronic self-noise, as well as the limited application of an array of vector sensors.

Thus, it is with respect to these considerations and others that the present invention has been made.

SUMMARY OF THE DESCRIPTION

The invention is a newly developed acoustic monitoring technology for underwater sound. The technology seeks to improve upon traditional acoustic sensing techniques by integrating a compact array of acoustic vector sensors into an underwater platform and providing a stream of sensor data from the platform for exploitation by users. In contrast, traditional acoustic sensing techniques typically involve the use of hydrophones that measure scalar acoustic pressure but which do not measure particle velocity.

In certain embodiments, the stream of sensor data from the array of acoustic vector sensors is provided in realtime to a surface buoy which performs intermediate processing and the results are transmitted to a cloud server and made available across a network for exploitation by users. In certain embodiments, the location of underwater noise sources is estimated and made available along with the sensor data. realtime Various embodiments are directed towards a system and method for monitoring underwater noise, including a vector sensor array device for receiving sensor data from an array of vector sensors, where each vector sensor generates a time series of sensor data, each sensor data sample including pressure and acoustic velocity measurements, converting the realtime sensor data to digital sensor data, accumulating a segment of digital sensor data, where a segment corresponds to the sensor data received over a designated time interval, transmitting the segment of sensor data, a buoy for receiving the transmitted segment of sensor data from the vector sensor array device, performing a Fast Fourier Transform (FFT) on the sensor data in each segment to yield frequency domain FFT results, accumulating a designated number of FFT results, each result corresponding to the results from one segment of senor data, averaging the designated number of FFT results, transmitting the averaged FFT results, and a cloud server for receiving the averaged FFT results from the buoy, storing the averaged FFT results, and enabling user devices to access the FFT results.

Certain embodiments are directed to a device for monitoring underwater acoustic noise, including a housing, a plurality of acoustic vector sensors, each attached to the housing, where each acoustic vector sensor provides a time series of measurements of acoustic pressure, and acoustic velocity, a data logger that includes a sealed housing, a processor, a data storage for storing the sensor measurement data, a nontransitory memory in communication with the processor for storing instructions, which when executed by the processor, cause the device to convert analog measurements from the plurality of vector sensors into digital sensor data, to store the digital sensor data, to accumulate a segment of digital sensor data, wherein a segment corresponds to the sensor data received over a designated time interval and to transmit the segment of digital sensor data to a buoy.

Additional embodiments are directed to device for monitoring underwater acoustic noise that includes a housing, a plurality of acoustic vector sensors, each attached to the housing, wherein each acoustic vector sensor provides a time series of (1) analog measurements of acoustic pressure and (2) analog measurements of triaxial acoustic particle velocity, (3) digital orientation data for one of the acoustic vector sensors, and a data logger that includes a sealed housing, a processor, a data storage for storing the time series of sensor measurement data and the orientation data, and a nontransitory memory in communication with the processor for storing instructions, which when executed by the processor, cause the device to convert the analog measurements from the plurality of vector sensors into digital sensor data, and to store the digital sensor data and the digital orientation data in the data storage.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

Reference symbols and labels are used in the Figures to indicate certain components, aspects or features shown therein, with reference symbols and labels common to more than one Figure indicating like components, aspects or features shown therein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

Acoustic monitoring system (AMS)—refers to a system that performs functions related to the characterization, classification, and geo-location of anthropogenic and natural sounds. The AMS described herein is specialized for sensing and analyzing underwater sources of sound.

Realtime or real-time—is used herein to indicate that the various components of the system are able to perform the various functions disclosed herein, including conversion from analog to digital, storage, transmission, computation of Fast Fourier Transforms without falling behind the incoming stream of sensor data. While portions of the data may be disregarded, the overall system operates at least as fast as the sensor data rate.

The subject invention has application in a variety of areas, including inter alia: soundscape characterization, environmental monitoring, aquatic fauna research, tracking, and monitoring, marine mammal density estimation, harbor and coast safety and security, ship tracking and monitoring, military operations, underwater mapping, offshore construction activities, and characterization and monitoring of aquatic technologies (e.g., marine renewable energy devices).

The subject invention operates across a complete range of natural and anthropogenic conditions including, for example: oceans, estuaries, lakes, rivers, harbors. The subject invention operates in water with varying depths and levels of clarity and salinity.

The invention is a newly developed acoustic monitoring technology for underwater sound. The technology seeks to improve upon traditional acoustic sensing techniques by integrating a compact array of acoustic vector sensors, providing accurate location information and disseminating the data in realtime to a cloud server for exploitation by users. Data may also be stored onboard until system recovery, at which time data would be post-processed by users. In contrast, traditional acoustic sensing techniques typically involve the use of hydrophones that measure scalar acoustic pressure, but which do not measure particle velocity.

Generalized Operation

The operation of certain aspects of the invention is described below with respect to FIGS. 1-2.

Figure 1:
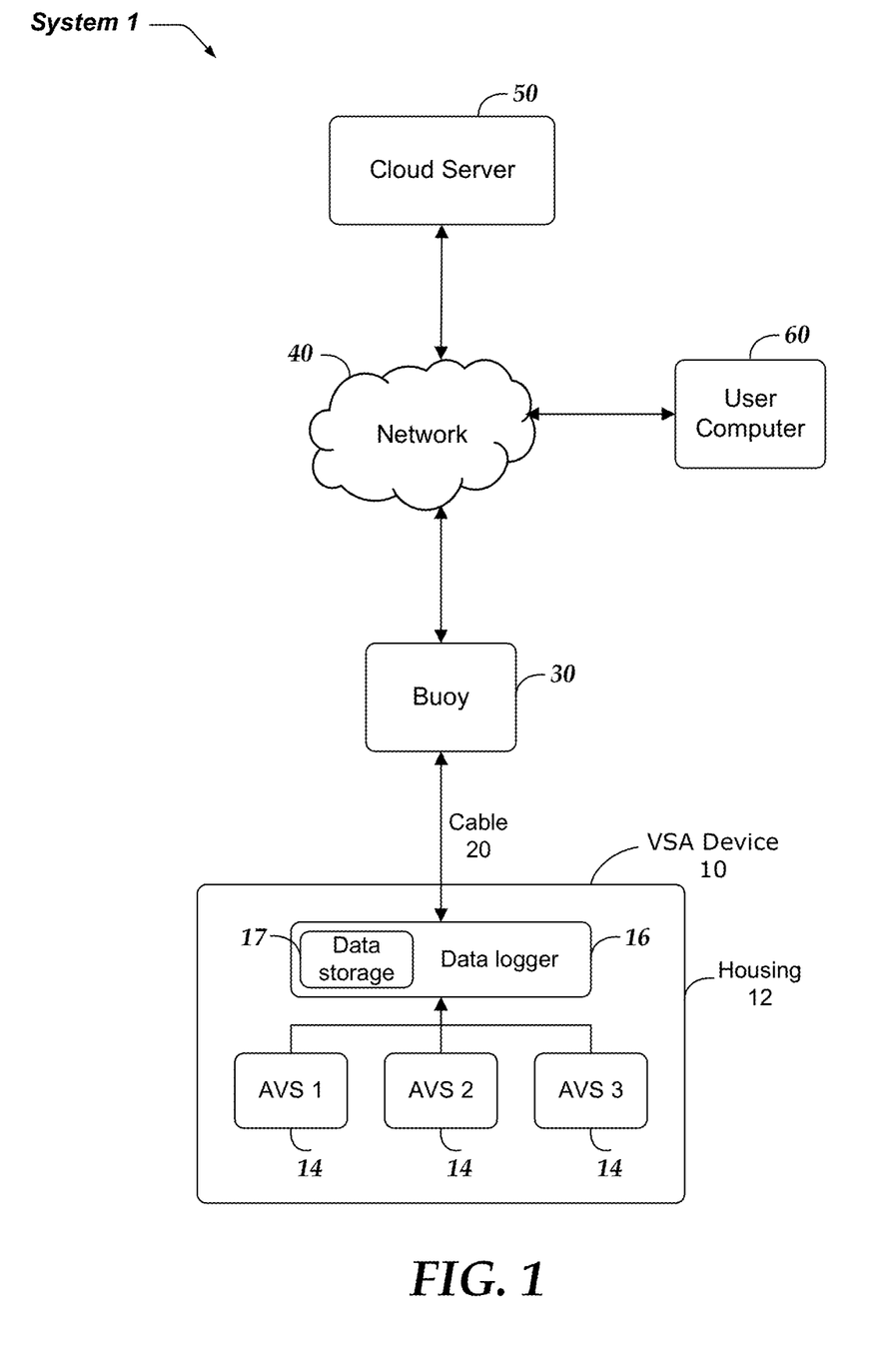
FIG. 1 is a block diagram of an embodiment of an acoustic monitoring system (AMS) that performs acoustic sensing and characterization of underwater noise.

FIG. 1 is a block diagram of an embodiment of an acoustic monitoring system (AMS) 1 that performs acoustic sensing and characterization of underwater noise. AMS 1 includes a VSA 10 device, a cable 20, a buoy 30, a network 40, a cloud server 50 and a user computer 60.

Vector sensor array (VSA) 10 includes a housing 12, one or more acoustic vector sensors (AVS) 14, also referred to as sensors 14, and a data logger 16. During normal operation, device 10 is submerged in a natural or anthropogenic water environment and rests at the bottom of the water environment. VSA 10 assembles two or more AVS 14 into an array, which improves spatial filtering capabilities when compared with arrays of same length and same number of hydrophones. Each AVS 14 measures both the acoustic pressure and the three components of particle velocity. Certain embodiments of VSA 10 include three AVS 14, a configuration that has been experimentally determined to yield acceptable results. However, the invention is not so limited and more or less AVS 14 may be included in vector sensor array 10 without departing from the scope of the present invention.

Electrical cable 20 data logger 16 to surface buoy 30 to facilitate realtime telemetry of data. Cable 20 may be a standard data communications cable, suitable for data communications such as Ethernet. Cable 20 may also refer to another type of sub-surface communication, such as sonar.

Buoy 30 may communicate sensor data in realtime via a network 40. Network 40 refers to any kind of transmission that is practical between a buoy in the open ocean or in another water environment and a processing system; thus, network 40 may include inter alia cellular, radio frequency (RF), or satellite technology. Further, upon being retrieved, buoy 30 may communicate with one or more external devices to provide sensor data and/or to report results.

In addition, a mooring line (not shown in FIG. 1) connects VSA device 10 to a surface buoy for recovery. The surface buoy may or may not be buoy 30. The system recovery method is not limited to a mooring line and can take the form of an acoustic release or other suitable mechanism.

Cloud server 50 represents one or more network computing devices that are configured to receive digitized sensor data across network 40 from buoy 30 and to provide the data upon request to user computer 60. Devices that may operate as cloud server 50 include, but are not limited to server computers, personal computers, desktop computers, multiprocessor systems, microprocessor-based or programmable consumer electronics, network PCs, servers, network appliances, and the like. Generally, cloud server 50 includes a process, and static memory for storing data and program code, dynamic memory, and data storage. Cloud server 50 includes a communications adapter that enables it to transmit and receive data across network 40.

Although cloud server 50 is illustrated as a distinct network device, the invention is not so limited. For example, a plurality of network devices may be configured to perform the functions of cloud server 50. One such configuration is a "server farm" that includes multiple server computers operating cooperatively, each performing some of cloud server 50 server functions. Further, cloud server 50 functions may also be provided by a cloud computing facility, or cloud service, in which the services, features and functions ascribed herein to cloud server 50 are delivered as a service over a network, such as the Internet, rather than by a specific server or cluster of servers. Examples of commercial cloud services are AMAZON AWS, MICROSOFT AZURE, and GOOGLE CLOUD.

Cloud server 50 is capable of running application programs ("applications"). Applications that may be run by cloud server 50 include transcoders, database programs, customizable user programs, security applications, encryption programs, VPN programs, web servers, applications servers, account management systems, and so forth. In particular, as described hereinbelow, in certain embodiments cloud server 50 performs location estimation of underwater noise sources and provide the results user computer 60.

Generally, user computer 60 includes any computing device capable of receiving and sending messages over a network, such as network 40, and which can be programmed to exploit acoustic sensor data stored on cloud server 50. User computer 60 includes personal computers, server computers, multiprocessor systems, microprocessor-based or programmable consumer electronics, mobile devices such as mobile telephones, smart phones, display pagers, tablet computers, handheld computers, laptop computers, and the like.

AMS 1 supports a number of processing embodiments: generally, processing steps can be allocated between VSA device 10, buoy 30, and cloud server 50. In certain embodiments, VSA device 10 provides digitized raw sensor data via cable 20 to buoy 30. Buoy 30 performs certain processing tasks and relays the processed data via network 40 to cloud server 50. Cloud server 50 may provide additional processing such as location estimate of sound sources and may also provide the processed sensor data to users, using one or more user computers 60.

Vector Sensor Array (VSA)

Figure 2:
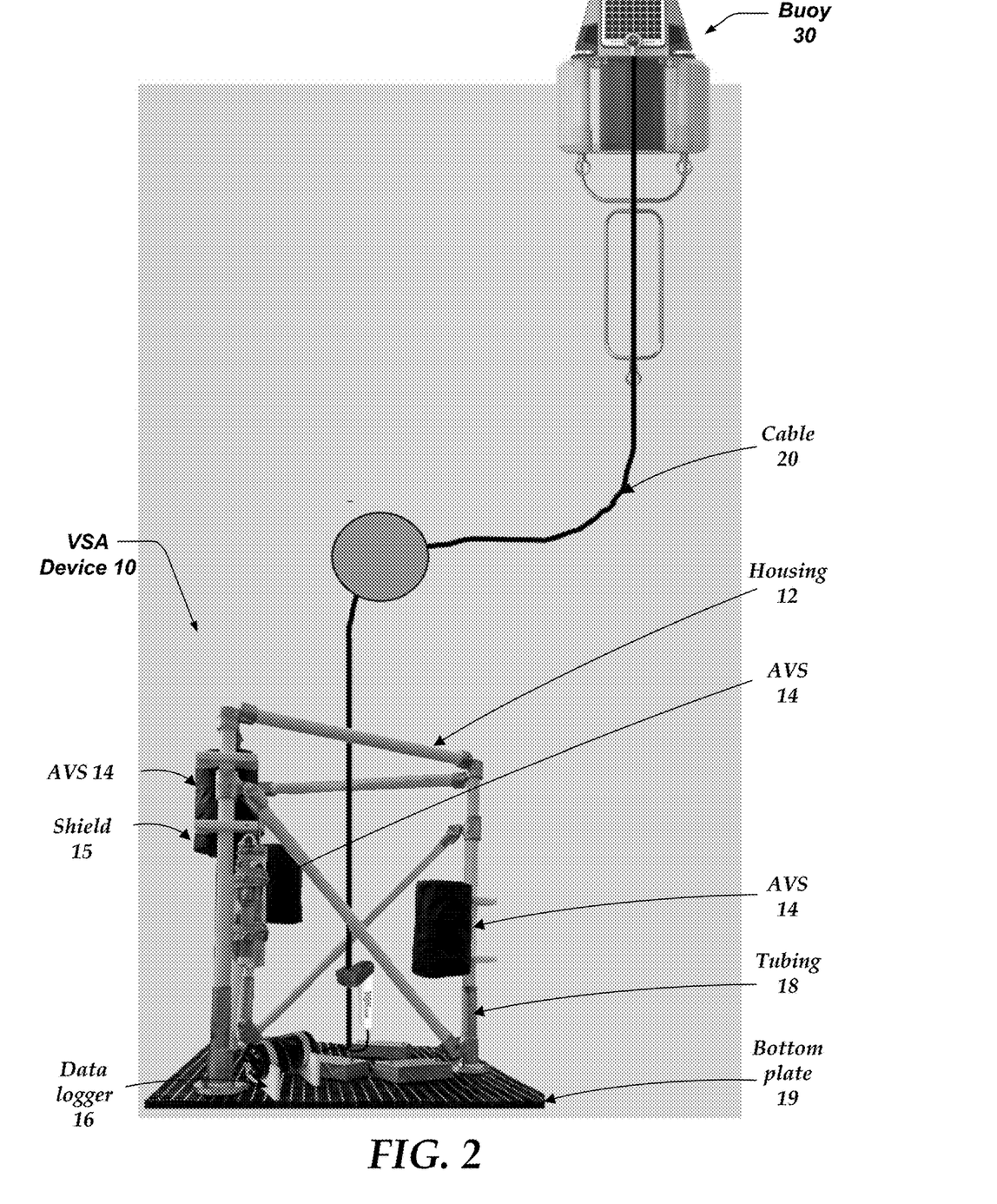
FIG. 2 illustrates one embodiment of a vector sensor array device for sensing underwater noise.

FIG. 2 illustrates an embodiment of VSA device 10 which includes three acoustic vector sensors (AVS) 14 attached to housing 12. Housing 12 also includes a bottom plate 19, which in one embodiment is a 1.25 m×1.25 m fiberglass grate. Bottom plate 19 secures data logger 16, battery packs (not visible), and weights such as lead bricks that weigh the bottom grate securely on the sea floor. Housing 12 can also be used to secure to other electronics equipment, such as a common off-the-shelf hydrophone acoustic recorder.

Housing 12 is formed of several segments of tubing and/or rods, referred to as tubing 18, which secure the AVS 14. In certain embodiments, tubing 18 is made of high-density polyethylene (HDPE), although other types of materials such as poly-vinyl chloride (PVC) and designs may be used. Housing 12 enables adjustment of horizontal and vertical spacing between each AVS 14. In certain embodiments, horizontal spacing of the system is a maximum of 80 cm, while the vertical spacing is a maximum of 40 cm. In other embodiments, the vertical and horizontal spacing may be greater or less. Generally, the position of each AVS 14 in VSA 10 is known and can be used in computations such as triangulation, as described hereinbelow with reference to FIG. 5. The modularity of the system allows the system configuration to be tuned to particular frequencies of interest while minimizing spatial aliasing that can occur when the half-wavelength is smaller than the array spacing. For example, location estimates of lower-frequency sounds (<1 kHz) require at least 1-m horizontal spacing for sensors, whereas a more compact and hand-deployable arrangement of sensors can be used to geolocate higher-frequency sounds. The use of HDPE allows for improved acoustic transparency, while minimizing the potential for low-frequency acoustic scattering by other more commonly used materials such as stainless steel or aluminum that have an acoustic impedance significantly different from that of seawater. The acoustic impedance of seawater is nominally 1.572 g/cm$^2$·s, while the acoustic impedances for aluminum, steel, and HDPE are 17.10, 45, and 2.937 g/cm$^2$·s, respectively.

A variety of tests and analysis were performed to determine if AVS 14 sensor data is contaminated by non-acoustic contributions to the sensed acoustic propagation. A major contributor to non-acoustic contributions is flow noise, which appear in the frequency band of 0-500 Hz on the pressure, x, and z particle velocity channels. To minimize flow sensor noise, each AVS 14 is wrapped in a flow noise shield 15. In one embodiment, shield 15 is constructed of ballistic nylon, such as 1050 ballistic nylon, wrapped around a baffled PVC tube inside which AVS 14 is suspended. Extensive laboratory tests of 1050 ballistic nylon revealed that it is acoustically transparent and significantly reduces flow inside the noise shield. Other types of ballistic nylon, nylon and similar fabrics may also be acceptable for this purpose. Therefore, reduction in flow noise is achieved due to reduction of flow inside shield 15. Furthermore, because of its acoustic transparency, AVS-measured acoustic signals are not affected.

In certain embodiments, VSA device 10 has three commercially available acoustic vector sensors (AVSs) 14 are employed. For example, in one embodiment, each AVS 14 is a commercial device from GEOSPECTRUM TECHNOLOGIES LTD. located in Dartmouth, Nova Scotia, Canada. Two model M20-40s and one M20-100 are used. These AVS 14 are rated to a 200 m water depth, which is adequate for many purposes. The M20-40 features a single wet-connect underwater cable that relays the four analog measurement fields (tri-axial particle velocity and omni-directional pressure) to an external amplifier circuit board. The M20-100 operates similarly to the M20-40, but also includes a second wet-connect underwater cable and digital amplifier circuit board that receives a digital compass output from the sensor. Power to the vector sensors is supplied via an amplifier circuit board connected to a rechargeable battery pack, and it is relayed to the sensors via the wet-connect underwater cable.

Vector sensor measurements, i.e. sensor data from AVS 14 consist of four measured quantities that represent acoustic pressure and particle velocity, represented as $A(x,t)=[p, vx, vy, vz]$, where the particle velocity components are expressed in units of pressure via the scaling $\rho c$, where $\rho$ is the density of seawater (1000 kg/m$^3$), and c is the nominal speed of sound in seawater (1500 m/s). The density of seawater and speed of sound in water are environmental variables that determine sound propagation in the ocean. The choice of constant values is a simplification that can contribute to the error variance of any processed metrics, including location estimates. Velocity components are typically measured in a local frame of reference and transformed to an earth-based frame of reference using Eulerean angles measured by an in-built or collocated inertial motion unit. The Fourier transform of the time series in $A(x,t)$ is given by $A(x,\omega)$.

AVS 14 is sensitive to acoustic frequencies in the 50 Hz-3 kHz range, with a flat frequency response on the pressure channel, and a peak in the response at 1 kHz on the particle velocity channels. This frequency range is particularly suited to measurement of anthropogenic sounds such as boats or those from MRE installations that primarily emit sound below 500 Hz and marine mammals whose hearing sensitivities fall within this frequency range, typically in the 50 Hz-3 kHz range. Examples of marine mammals that primarily vocalize in (and are, therefore, sensitive to) this frequency range are the larger cetaceans that include mysticete whales and sperm whales (specific species include the blue whale, fin whale, gray whale, Bryde's whale, right whales, minke whales, bowhead whales, humpback whales, sei whales, and beaked whales). The nominal pressure sensitivity of the AVS 14 pressure channel at 1 kHz is −179 dB re V/μPa, which, along with the saturation level of the sensors, allows for measurement of sound pressure levels up to 240 dB re 1 μPa at a distance of 100 m from the sensor. This level is well above sound pressure levels that can cause permanent threshold shifts in marine mammal hearing.

Data logger 16 is a processor assembly that receives sensor data from one or more AVS 14 devices; performs some amount of pre-processing in certain embodiments, stores the processed data, and transmits the processed data to buoy 30. Data logger 16 includes a processor, static memory for program code storage and data and a data storage device 17, referred to as data storage 17, such as a solid state disc. Data logger 16 has a stainless steel, sealed, pressure housing, which mounts on a bottom plate 16 that rests on the bottom surface of the water environment that device 10 is measuring, e.g. an ocean, lake or harbor. In certain embodiments, data logger 16 is constructed of aluminum or Delrin and bottom plate 16 is a fiberglass grate.

VSA device 10 is designed to operate autonomously for at least three weeks without servicing. In-water tests indicate that the hardware configuration is suitable for deployments/recoveries from a small-vessel (for example, up to 8 meters in length) and operates effectively in a variety of water environments, including in quiescent, energetic, and deep-water.

Cable 20 is a cable suitable for underwater transmission that enables realtime data to stream from the data logger to a surface buoy 30. In certain embodiments, cable 20 is a FALMAT FMXCAT5 K12 cable.

Figure 3:
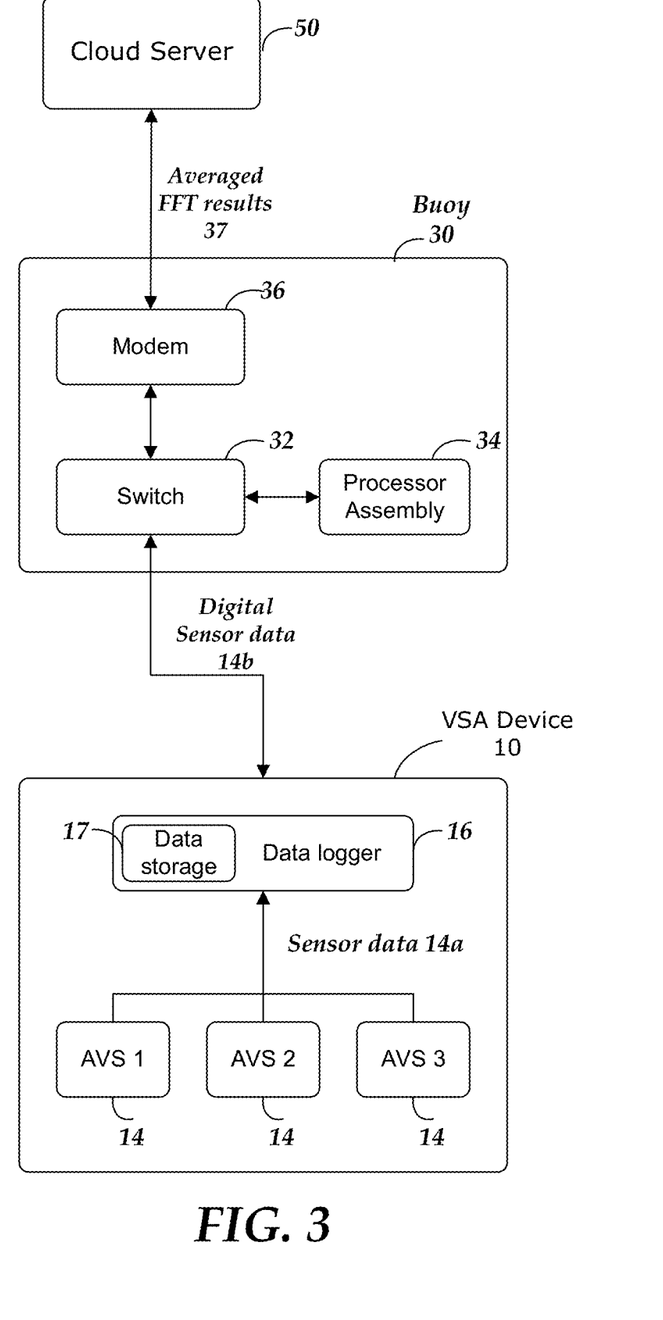
FIG. 3. illustrates one embodiment of the data flow through the acoustic monitoring system.

FIG. 3 illustrates the data flow through AMS 1. Each of the three AVS 14 generates a stream of analog sensor data 14a, i.e. time sequence, or series, of data that has four channels (x, y, z, and pressure). As previously mentioned, each sample is represented as $A(x,t)=[p, vx, vy, vz$.

Thus, twelve analog channels (x, y, z, and pressure for each of the three sensors) of time-synchronized VSA data at 24 bits and one digital channel (orientation) are received and recorded by data logger 16 at a realtime sampling rate. In certain embodiments, a synchronous sampling rate of 20 kHz per channel is employed.

Data logger 16 converts the analog sensor data from the AVS 14 devices to digital format. The digital sensor data 14b is stored in data storage 17. In certain embodiments, data logger 16 stores all digital sensor data 14b for a specified time interval, e.g. 3 weeks, while simultaneously transmitting the data in realtime via cable 20 to buoy 30 for processing. In other embodiments, referred to as non-realtime embodiments and described further hereinbelow, data logger 16 stores all digital sensor data 14b for a specified time interval but does not transmit the data in realtime to buoy 30.

Data logger 16 includes a transceiver that transmits digital sensor data 14b in realtime to buoy 30.

Figure 4A:
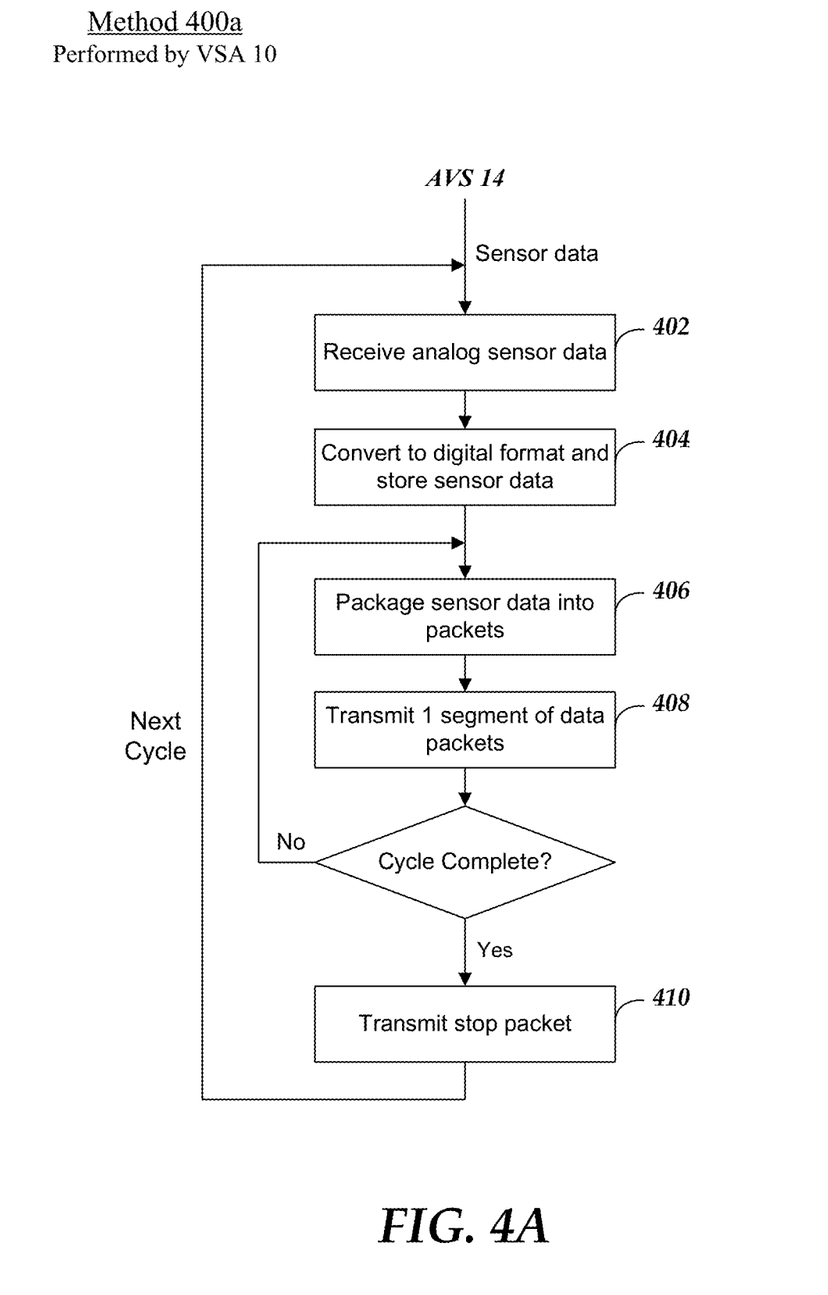
FIG. 4A illustrates one embodiment of a method for processing, storing and transmitting sensor data by a vector sensor array device.
Figure 4B:
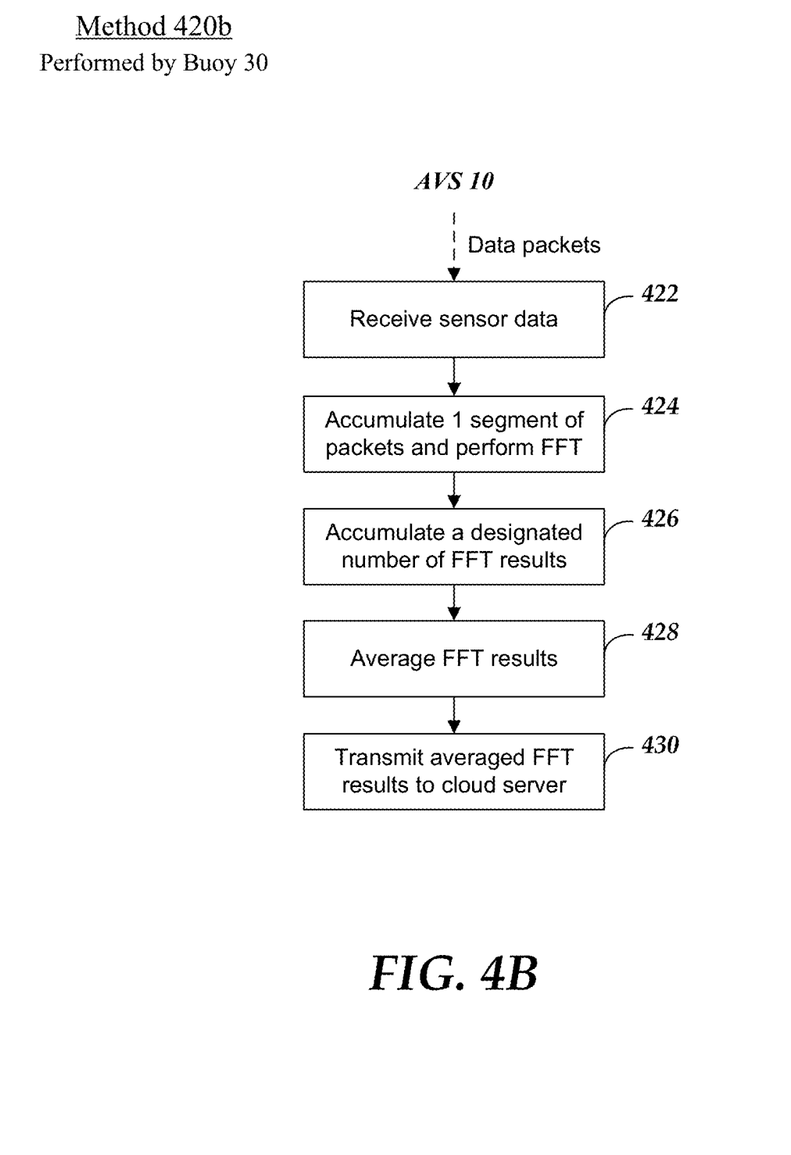
FIG. 4B illustrates one embodiment of a method performed by a buoy that processes incoming sensor data from the vector sensor array device.

FIGS. 4A-4B illustrate one embodiment of the processing performed by AVS 10 and buoy 30 to process a realtime flow of sensor data from an array of AVS 14 devices. The flow of data is managed to account for processor speeds, communications bandwidth so as to provide adequate information to cloud server 50 to enable subsequent analysis and post-processing by the scientific and technical community. While there are a wide variety of embodiments that could potentially solve this problem, the methods describe with reference to FIGS. 4A-B have been experimentally determined to be an effective solution.

FIG. 4A illustrates one embodiment of a method 420a for processing, storing and transmitting sensor data by VSA 10. Method 420a is performed over a time interval, nominally 60 seconds, also referred to as a cycle. The method repeats every 60 seconds, i.e. after a time interval elapses.

Processing uses a double buffer scheme whereby, at step 402, one buffer receives analog data, also referred to as measurements, from the three AVS 14 sensors. The data, in analog format is converted to digital values. Simultaneously, at step 404, the other buffer, filled with digital sensor data is written to disk and stored.

At step 406, once data is stored on disk, the same data is parsed into Ethernet packets for transmission to buoy 30 using a User Datagram Protocol (UDP). The twelve channels of digital sensor data (4 channels per AVS 14) are parsed or packaged into forty two (42) UDP packets that constitute 2040 data samples for each of the 12 channels. The 2040 data samples roughly correspond to 100 milliseconds of sensor data. Note that while 2048 would be a more advantageous number of samples there is a constraint on the size of UDP packets that limits the amount of data that can be included; so 2040 samples are transmitted.

Each data packet additionally contains one sample of orientation data (pitch, roll, heading and time tick) that describes the orientation of one of the AVS 14. The orientation data flows through the system and is eventually stored on cloud server 50. It may be appreciated that AVS 10 is typically lowed from a boat to the bottom of a water environment and will rest at an arbitrary, unknown angle or rotation on the bottom. Thus, the orientation data may be used to transform, or rotate, the AVS 14 data into true earth coordinates. For example, transforming the triaxial acoustic particle velocity measurements must be performed to estimate the location of noise sources, as discussed hereinbelow. The orientation data may be considered as a 13th data channel.

At step 408, the 42 packets are transmitted to buoy 30.

After transmission, a short delay is introduced to allow for the buoy 30 to perform an FFT operation on each of the twelve 2040-samples of data, i.e. on one segment of data. Following this delay, the next set of 42 packets are transmitted to buoy 30. Once 45 seconds have elapsed since the beginning of data transmission to buoy 30, at step 408 a 'stop group' packet is transmitted signaling an end to transmissions for that 60 s period. The 45 seconds of transmission corresponds to roughly 30 s of data. The above cycle is then repeated every 60 s.

Non-Realtime Embodiments

VSA 10 can operate in a non-realtime manner in which digitized sensor data is stored for subsequent recovery and exploitation; but is not communicated in realtime to buoy 30. In such embodiments, logger 16 receives and stores digitized sensor data in data storage 17, housed within logger 16 until AVS 10 is recovered from the water. Then the sensor data stored in data storage 17 is retrieved. At this point, the data can be analyzed or made available to users. To be explicit, in such non-realtime embodiments VSA 10 performs only steps 402 and 404 of method 400*a*. It does not package the sensor data or transmit it to buoy 30.

Surface Buoy

Buoy 30 provides digital sensor data from VSA device 10, either raw or processed, to cloud server 50. In certain cases, buoy 30 performs intermediate processing but in other embodiments it acts an ocean-based relay between a submerged sensor device, i.e. VSA device 10, and a cloud server 50.

Buoy 30 includes an ethernet switch 32 a processor assembly 34, a modem 36, and a battery 38. Processor assembly 34 (referred to hereinbelow simply as processor 34) includes a microprocessor and static memory for storing program code and data. In certain embodiments, processor 34 is a TEENSY 3.6 microcontroller board that includes a floating-point unit (FPU), static and dynamic memory, and various communication channels or ports. Buoy 30 also includes a battery (not shown) that supplies power to a switch 32, and a modem 36. Modem 36 is typically a cellular modem but may communicate using other modalities such as RF or satellite.

FIG. 4B illustrates one embodiment of a method 420*b* performed by buoy 30 that processes incoming sensor data from VSA 10, via data logger 16. At step 422 buoy 30 receives packets of digital sensor data transmitted by data logger 16.

At step 424 buoy 30 accumulates 1 segment of data packets, i.e. 42 UDF packets, and performs FFT processing on each of the 12 channels of sensor data independently. It may be appreciated that while 2040 data samples are transmitted for each channel in a segment it may be more efficient to perform the FFTs on 2048 samples, thus 8 zeros or other values may be added as padding.

At step 426, a designed number of FFT results are accumulated. For example, 100 segments of FFT results may be accumulated.

Then at step 428 these results are averaged to yield averaged FFT results 37. In this embodiment, each segment corresponds to 100 milliseconds of sensor data, thus 100 segments correspond to a 10 second period. The averaging of FFT results serves as a data compression step, thus averaging 100 segments of data effectively compresses the data stream by a factor of 100. Averaging FFT results entail independently averaging the amplitude (real) and phase (imaginary) parts of each of 100 FFT results for each frequency bin for each channel.

At step 430 buoy 30 transmits the averaged FFT results 37 to cloud server 50.

In certain embodiments, buoy 30 is a data buoy from NEXSENS TECHNOLOGY, such as a CB-50 data buoy. Buoy 30 typically includes a removable tower that protects the electronics, a solar, sensor connector ports that connect to a data cable, a marine light, a data logging system, which includes integrated power supply and wireless telemetry. Buoy 30 may provide a variety of communications mechanisms, including inter alia radio-to-shore, cellular, and satellite communications.

Location Estimation

A key principle of long-distance underwater acoustic propagation is that sound travels along discrete paths between a source and a receiver. Given the uniqueness of an acoustic field between a source and receiver, a variety of techniques can be employed to determine the three-dimensional location of a sound source within the water column (i.e. latitude, longitude and depth). These techniques vary in hardware complexity, accuracy, and computational efficiency based on the underlying physical assumptions. VSA device 10 improves upon direction of arrival estimation by using a spatially arrayed cluster of acoustic vector sensors (AVS 14), each of which measures triaxial acoustic particle velocity in addition to acoustic pressure. Each AVS 14 has the ability to determine the bearing (azimuth and elevation angle) of an acoustic source relative to the VSA device. With multiple time-synchronized acoustic vector sensors located on the array, the source of a noise, such as a boat, ship, marine mammal or marine energy installation, can be geolocated by triangulation of particle velocity vectors measured across a linear array of AVS 14. To synchronize the samples, data logger 16 provides a common clock across the 12 analog sensor channels (4 channels per AVS 14).

Figure 5:
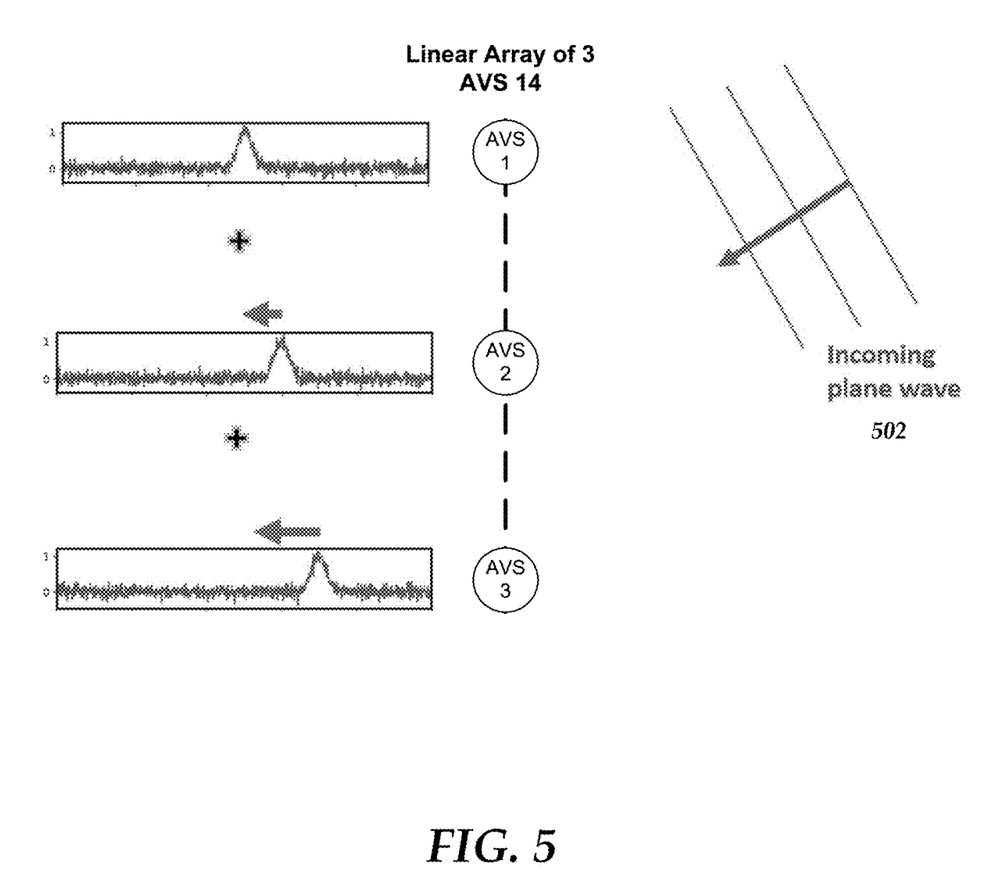
FIG. 5 illustrates the basic principle of triangulation using the vector sensor array device.

FIG. 5 illustrates the basic principle of triangulation as it applies to VSA device 10. Here, a plane wave 502 impinges upon a linear array of three acoustic vector sensors, i.e. three AVS 14. For a given angle of incidence, the signal received on each channel of the acoustic array is offset by a frequency-dependent phase relative to that received on neighboring channels. The angle of arrival of the plane wave can be computed using plane-wave beamforming, which acts by phase-shifting the signal on each channel, followed by coherently summing over the array. A larger number of array channels result in a greater array gain, as well as better suppression of incoherent random noise, while reinforcing a coherent signal. A vector sensor makes four acoustic measurements on each sensor. Therefore, a vector sensor array can exhibit four times the array gain of a traditional hydrophone array with the same number of physical sensors.

Figure 6:
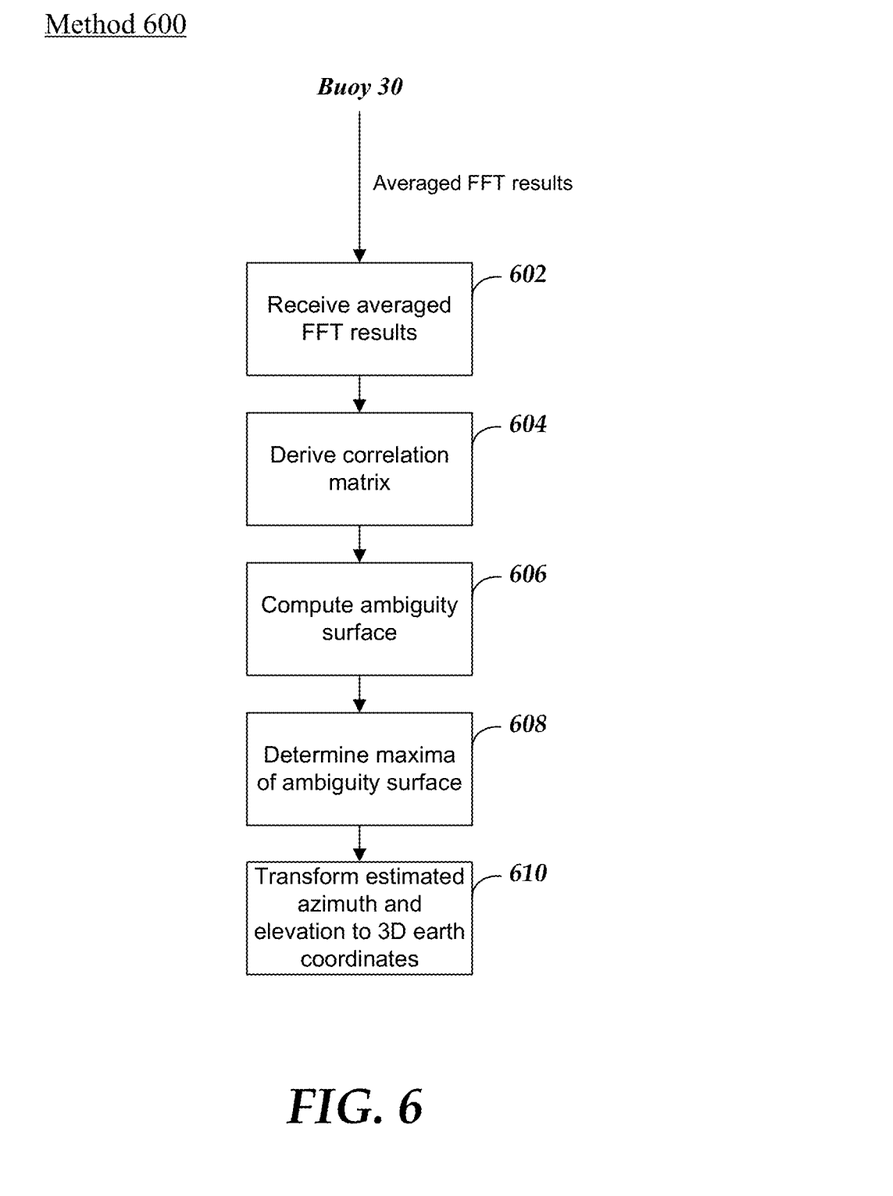
FIG. 6 illustrates one embodiment of a method for estimating location of an acoustic source.

Determining the source of an underwater noise, commonly referred to as location estimation, is a fundamental problem in the analysis of underwater noise. FIG. 6 illustrates one embodiment of a method for estimating location. This method adapts a methodology of Santos et al. that uses plane wave beamforming. ["Source localization with vector sensor array during the Makai experiment." In Proceedings of the 2nd International Conference and Exhibition on Underwater Acoustic Measurements: Technologies and Results, Heraklion, Greece, 25-29 Jun. 2007; pp. 895-900.]

At step 602 the FFT results transmitted by buoy 30 at step 430 are received.

Next, at step 604, a correlation matrix is derived from the 12-channel averaged FFT results 37 at each frequency bin in the results data. The diagonal elements of the correlation matrix represent the autocorrelation of each pressure or velocity channel, while the off-diagonal elements represent pressure-velocity cross-correlation terms.

At step 606, an ambiguity surface is computed for an exhaustive set of potential azimuth and elevation angles.

At step 608 a location of a maxima in the ambiguity surface is then determined, which represents the bearing, i.e. the azimuth and elevation angle of the acoustic source relative to VSA 10.

At step 610, the estimated azimuth and elevation angle are transformed into a three-dimensional location in earth coordinates using the digital compass data, and a priori knowledge of the source depth.

Figure 7:
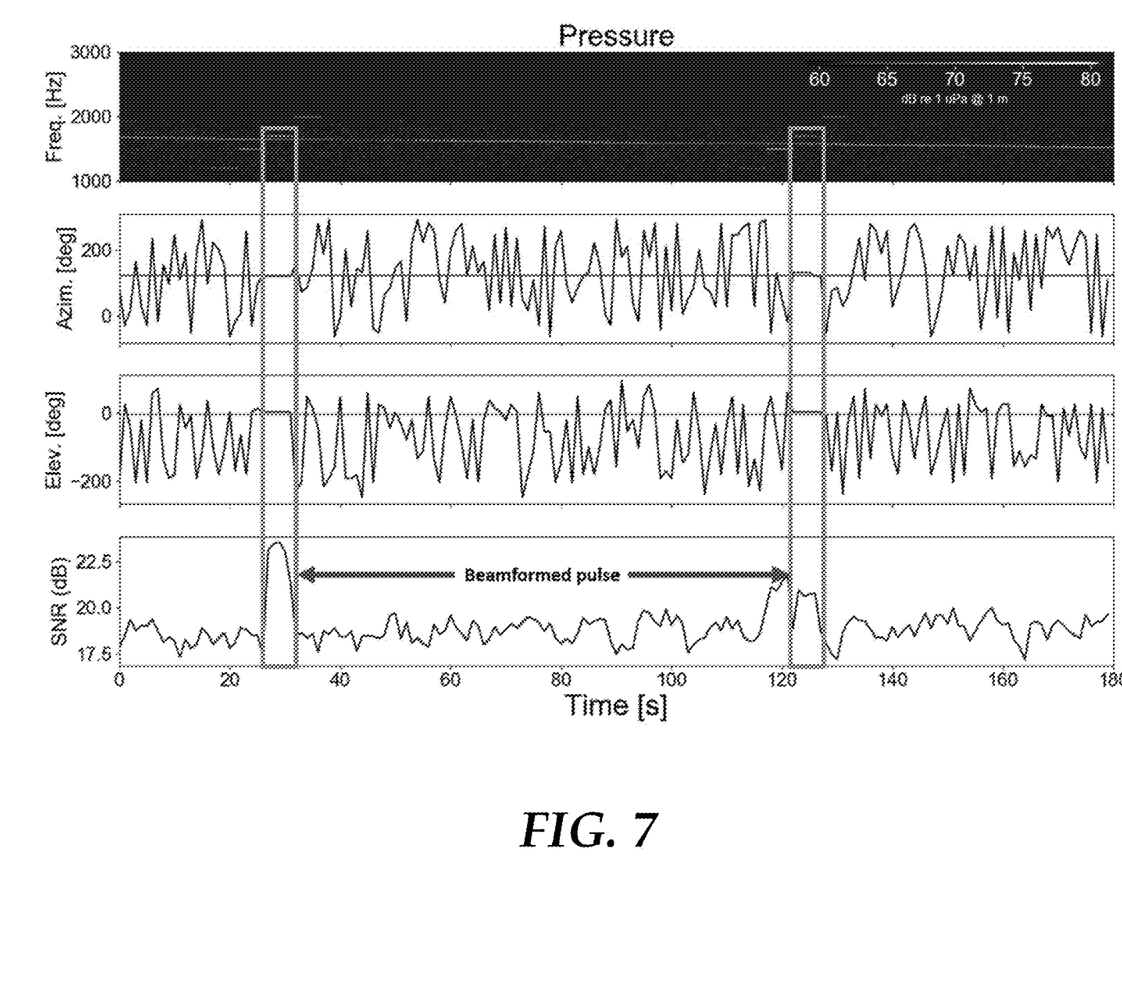
FIG. 7 shows one example of location estimates obtained using the method of FIG. 6

Extensive field testing of the system in quiescent and energetic environments with known acoustic source transmissions have yielded consistently accurate location estimates (within 5% of actual). For example, bearing estimation was conducted for multiple 6-min-long time series of controlled acoustic source transmissions that were obtained at various source receiver separations (10 m, 50 m, 100 m, 500 m, and 1 km) during in-water field testing. FIG. 7 shows one example of elevation and azimuth estimates obtained for a 3-min-long time series, when the source was located 180 m from the receiver. Shown in the upper panel is a spectrogram of the received signal, which shows the evolution of the frequency content of received signals. Receptions of the controlled source transmissions are seen as the step-like progression in energy across frequency as an evolution of time. The frequency-domain beamforming processing is performed for the tone at 1700 Hz, selected to demonstrate that specific tones can be geolocated, while ignoring sources at other frequencies. Estimates of azimuth and elevation angle during these periods are seen to closely track the true bearing of the source. Outside of these periods where the source was transmitting, the bearing angles exhibit significantly larger deviations from the true bearing, consistent with isotropic ambient noise that has no dominant direction.

Figure 8:
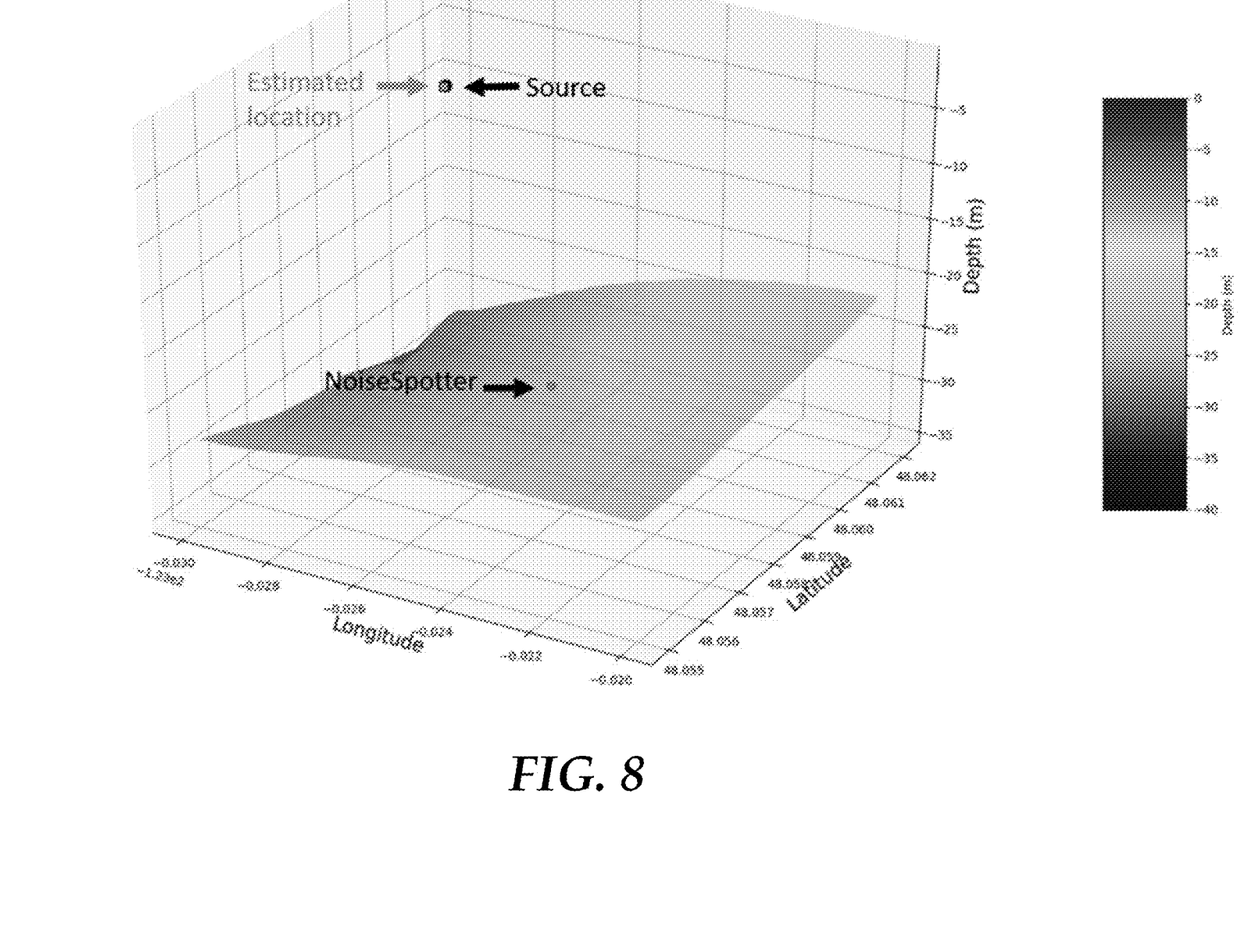
FIG. 8 illustrates one example of the true location of a noise source in relation to the vector sensor array device obtained using the method of FIG. 6.

FIG. 8 illustrates the true location of the noise source in relation to VSA 10, having estimated the three-dimensional bearing angle to the source assuming a known source depth. This assumption is valid when trying to associate measured signals with MRE devices, whose locations are usually known in the water column. The estimated source location is seen to be co-located with the true source location, with an estimation error of 3.6 m or 2% of the source-receiver separation distance.

Overall Processing

Figure 9:
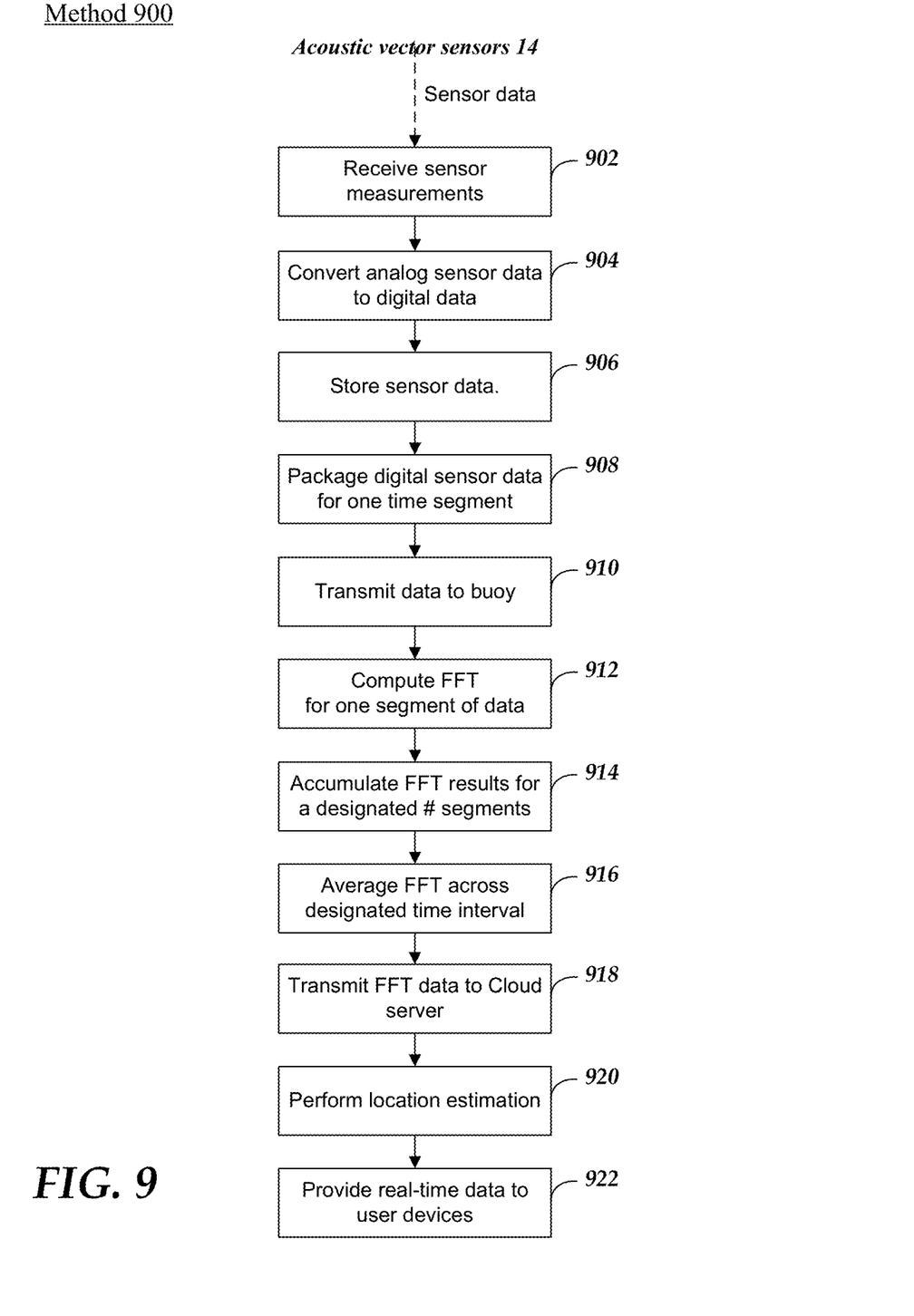
FIG. 9 is a flow diagram of one embodiment of the overall processing steps performed by the acoustic monitoring system.

FIG. 9 is a flow diagram of one embodiment of the overall processing steps performed by acoustic monitoring system (AMS) 1. At step 902 acoustic vector sensors (AVS) 14, submerged in the ocean or in another water environment, receives sensor measurements from an array of AVS 14, each providing a stream or channel of pressure and triaxial acoustic particle velocity values. The sensor measurements are provided to data logger 16.

At step 904 data logger 16 converts the analog sensor values to digital format and stores the data at step 706.

At step 908 data logger 16 packages the 12 channels of data as well as a 13 channel of orientation data into a segment of data. At step 910 data logger 16 transmits a segment of data to buoy 30. Steps 902-910 repeat on an ongoing basis during normal operation of VSA 10 until it is eventually withdrawn from the water environment.

At step 912 buoy 30 performs a Fast Fourier Fransform (FFT) computation on a segment sensor data.

At step 914 buoy 30 accumulates FFT results for a number of segments, At step 916 buoy 30 averages the FFT results.

At step 918 buoy 30 transmits the averaged FFT data to cloud server 50 for 12 channels along with the orientation data.

As an optional step, at step 920 cloud server 50 performs location estimation on the averaged FFT data to identify and estimate the location of sources of acoustic noise present in data.

At step 922 cloud server 50 makes the averaged FFT results and, if available, the location estimation results available to users across network 40. Thus, an academic, scientific, or other type of user can access the data from a user computer 60 across a network and use the data for further analysis. For example, in addition to location estimation, peak and root mean square sound levels can be computed by calculating the total spectral energy.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A system for monitoring underwater noise, comprising a vector sensor array device for:
    receiving sensor data from an array of vector sensors, wherein each vector sensor generates (1) a time series of sensor data, each sensor data sample comprising pressure and acoustic velocity measurements, and (2) orientation data that specifies the orientation of one of the acoustic vector sensors, wherein the segment of transmitted sensor data includes the orientation data;
    converting the realtime sensor data to digital sensor data;
    accumulating a segment of digital sensor data, wherein a segment corresponds to the sensor data received over a designated time interval;
    transmitting the segment of sensor data and the orientation data;
a buoy for:

receiving the transmitted segment of sensor data and the orientation data from the vector sensor array device;

performing a Fast Fourier Transform (FFT) on the sensor data in each segment to yield frequency domain FFT results;

accumulating a designated number of FFT results, each result corresponding to the results from one segment of senor data;

averaging the designated number of FFT results;

transmitting the averaged FFT results and the orientation data; and a cloud server for:
receiving the averaged FFT results and the orientation data from the buoy;
storing the averaged FFT results; and
enabling user devices to access the FFT results and the orientation data.

2. The system of claim 1 wherein each vector sensor is wrapped in a shield to reduce flow noise.

3. The system of claim 1 wherein the vector sensor array device further comprises:
a data logger for:
combining the sensor data from the plurality of vector sensors;
converting analog measurements from the plurality of vector sensors into digital format;
storing the digital sensor data; and
transmitting the sensor data to the buoy.

4. The system of claim 1 wherein performing a Fast Fourier Transform (FFT) on each time interval to yield frequency domain FFT results for each time interval comprises:
independently performing an FFT on each of four channels of data for each vector sensor, wherein the four channels of data consist of pressure data, x-axis particle velocity data, y-axis particle velocity data, and z-axis particle velocity data.

5. The system of claim 4 wherein the FFT results for each channel comprise amplitude and phase values for each of a plurality of frequency bins and averaging the designated number of FFT results comprises independently averaging the amplitude and the phase values of each of the designated number of FFT results.

6. The system of claim 1 wherein the cloud server is further operable for:
performing location estimation to determine sources of underwater noise based on the averaged FFT results and on the orientation data; and
enabling user devices to access the location estimation results.

7. The system of claim 1 further comprising:
a data communications cable that connects at one end to the vector sensor array device and at the other end to the buoy, and which enables the vector sensor array device to transmit the digitized sensor data to the buoy.

8. A computer-implemented method for monitoring underwater noise, comprising:
receiving (1) a time series of sensor measurements from an underwater array of vector sensors, wherein each measurement comprises a pressure value and a particle velocity value for each of three axes, and (2) a time series of digital orientation data that specifies the orientation of one of the vector sensors;
converting the received sensor measurements to digital sensor data;

transmitting the digital sensor data and the digital orientation data to a surface buoy;
segmenting the time series of digital sensor data into time segments;
computing a Fast Fourier Transform (FFT) on the digital sensor data in each time segment;
averaging the FFT results for a designated number of time segments;
transmitting the averaged FFT results and the digital orientation data for the time period corresponding to the averaged FFT results to a cloud server;
enabling user devices to access from the cloud server the averaged FFT results and the digital orientation data.

9. The computer-implemented method of claim 8 wherein performing a Fast Fourier transform (FFT) on each time interval to yield frequency domain FFT results for each time interval comprises independently performing an FFT on each of four channels of data provided by each vector sensor, wherein the four channels of data consist of pressure data, x-axis particle velocity data, y-axis particle velocity data, and z-axis particle velocity data.

10. The computer-implemented method of claim 9 wherein the FFT results for each channel comprise amplitude and phase values for each of a plurality of frequency bins and averaging the designated number of FFT results comprises independently averaging the amplitude and the phase values of each of the designated number of FFT results.

11. The computer-implemented method of claim 8 further comprising:
computing an estimate of the location of a noise source based on the averaged FFT results and on the digital orientation data; and
enabling user devices to access the location estimation results.

12. A device for monitoring underwater acoustic noise, comprising:
a housing;
a plurality of acoustic vector sensors, each attached to the housing, wherein each acoustic vector sensor provides a time series of measurements of acoustic pressure, and acoustic velocity;
a data logger, comprising;
a sealed housing;
a processor;
a data storage for storing the sensor measurement data; and
a nontransitory memory in communication with the processor for storing instructions, which when executed by the processor, cause the device:
to convert analog measurements from the plurality of vector sensors into digital sensor data;
to store the digital sensor data;
to accumulate a segment of digital sensor data, wherein a segment corresponds to the sensor data received over a designated time interval; and
to transmit the segment of digital sensor data to a buoy.

13. The device of claim 12 wherein each vector sensor is wrapped in a shield to reduce flow inside the shield.

14. The device of claim 13 wherein the shield is constructed of ballistic nylon fabric wrapped around a baffled poly-vinyl chloride (PVC) tube inside which an acoustic vector sensor is suspended.

15. The device of claim 12 wherein the plurality of acoustic vector sensors is a linearly aligned array of three vector sensors.

16. The device of claim 12 wherein one of the plurality of acoustic vector sensors provides a digital compass output that comprises a true earth orientation of the acoustic vector sensor.

17. The device of claim 16 wherein the instructions, when executed by the processor, further cause the device:
to transmit the digital compass output for the designated time interval to the buoy.

18. The device of claim 12 wherein the wherein the instructions, when executed by the processor, further cause the device:
converting analog measurements from the plurality of acoustic vector sensors into digital format; and
after transmitting a specified number of segments of digital sensor data to the buoy, to transmit a stop packet to the buoy.

19. The device of claim 12 further comprising a data communications cable that attaches at one end to the data logger and at the other end to the buoy and which enables the data logger to transmit the segment of digital sensor data to the buoy.

20. A device for monitoring underwater acoustic noise, comprising:
a housing;
a plurality of acoustic vector sensors, each attached to the housing, wherein each acoustic vector sensor provides a time series of (1) analog measurements of acoustic pressure and (2) analog measurements of acoustic velocity, (3) digital orientation data for one of the acoustic vector sensors;
a data logger, comprising;
a sealed housing;
a processor;
a data storage for storing the time series of sensor measurement data and the orientation data; and
a nontransitory memory in communication with the processor for storing instructions, which when executed by the processor, cause the device:
to convert the analog measurements from the plurality of vector sensors into digital sensor data; and
to store the digital sensor data and the digital orientation data in the data storage.

\* \* \* \* \*